United States Patent
Guan et al.

(10) Patent No.: US 9,516,496 B2
(45) Date of Patent: Dec. 6, 2016

(54) DATA TRANSMISSION METHOD, EVOLVED NODEB AND USER EQUIPMENT

(71) Applicant: Huawei Technologies Co., Ltd., Shenzhen, Guangdong (CN)

(72) Inventors: Lei Guan, Shenzhen (CN); Yongxia Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 14/011,098

(22) Filed: Aug. 27, 2013

(65) Prior Publication Data
US 2014/0010067 A1    Jan. 9, 2014

Related U.S. Application Data

(63) Continuation of application No. PCT/CN2012/071300, filed on Feb. 20, 2012.

(30) Foreign Application Priority Data

Feb. 28, 2011    (CN) .......................... 2011 1 0047812

(51) Int. Cl.
*H04W 8/30*      (2009.01)
*H04W 28/04*     (2009.01)
(Continued)

(52) U.S. Cl.
CPC .............. *H04W 8/30* (2013.01); *H04L 1/1854* (2013.01); *H04L 1/1864* (2013.01);
(Continued)

(58) Field of Classification Search
CPC .... H04L 1/1854; H04L 1/1864; H04L 1/1887; H04L 1/1896; H04W 28/04; H04W 72/02; H04W 72/1289; H04W 88/08; H04W 8/30
(Continued)

(56) References Cited

U.S. PATENT DOCUMENTS

2009/0070650 A1*   3/2009   Bourlas et al. ............... 714/748
2009/0077430 A1*   3/2009   Cho et al. ..................... 714/701
(Continued)

FOREIGN PATENT DOCUMENTS

CN      101400081 A     4/2009
CN      101651895 A     2/2010
(Continued)

OTHER PUBLICATIONS

ETSI, "LTE; Evolved Universal Terrestrial Radio Access (E-UTRA); Physical layer procedures", Oct. 2009, ETSI, 3GPP TS 36.213 version 8.8.0 Release 8, pp. 9-15, 49-58, 68-73.*

*Primary Examiner* — Un C Cho
*Assistant Examiner* — Shah Rahman
(74) *Attorney, Agent, or Firm* — Leydig, Voit & Mayer, Ltd.

(57) ABSTRACT

The embodiments disclose a data transmission method, an evolved NodeB (eNB) and a User Equipment (UE), which can avoid data transmission conflict, and improve data transmission performance and scheduling flexibility. The method according to the embodiments comprises: selecting, by an eNB, a second subframe from a plurality of subframes, when the eNB does not correctly receive a data packet transmitted by a UE in a first subframe; and transmitting, by the eNB, a scheduling signaling to the UE, so that the UE transmits a retransmission packet of the data packet in the second subframe. The embodiments further provide an eNB and a UE. The embodiments of the present invention can effectively avoid data transmission conflict, and improve data transmission performance and scheduling flexibility.

17 Claims, 4 Drawing Sheets

(51) Int. Cl.
*H04L 1/18* (2006.01)
*H04W 72/02* (2009.01)
*H04W 72/12* (2009.01)
*H04W 88/08* (2009.01)

(52) U.S. Cl.
CPC .......... *H04L 1/1887* (2013.01); *H04L 1/1896* (2013.01); *H04W 28/04* (2013.01); *H04W 72/02* (2013.01); *H04W 72/1289* (2013.01); *H04W 88/08* (2013.01)

(58) Field of Classification Search
USPC .................................................. 370/216, 329
See application file for complete search history.

(56) References Cited

U.S. PATENT DOCUMENTS

| | | | | |
|---|---|---|---|---|
| 2009/0249153 | A1 | 10/2009 | Zhang | |
| 2010/0182939 | A1* | 7/2010 | Ojala | H04L 1/1854 370/280 |
| 2010/0246521 | A1* | 9/2010 | Zhang et al. | 370/329 |
| 2011/0075611 | A1* | 3/2011 | Choi | H04L 1/1819 370/329 |
| 2011/0211503 | A1* | 9/2011 | Che | H04L 5/0005 370/280 |
| 2012/0147734 | A1* | 6/2012 | Kim | H04L 1/1887 370/216 |

FOREIGN PATENT DOCUMENTS

| | | | | |
|---|---|---|---|---|
| CN | 101729128 A | * | 6/2010 | ............... H04B 7/26 |
| CN | 101882985 A | | 11/2010 | |
| CN | 101895379 A | | 11/2010 | |
| CN | 101926214 A | | 12/2010 | |
| EP | 2104264 A2 | | 9/2009 | |
| WO | WO 2008041824 A2 | | 4/2008 | |
| WO | WO 2009022855 A2 | | 2/2009 | |
| WO | WO 2010049587 A1 | * | 5/2010 | ............ H04W 72/12 |
| WO | WO 2010129295 A1 | | 11/2010 | |

* cited by examiner

DATA TRANSMISSION METHOD, EVOLVED NODEB AND USER EQUIPMENT

CROSS-REFERENCE TO RELATED APPLICATIONS

This application is a continuation of International Patent Application No. PCT/CN2012/071300, filed on Feb. 20, 2012, which claims priority to Chinese Patent Application No. 201110047812.8 filed on Feb. 28, 2011, both of which are hereby incorporated by reference in their entireties.

TECHNICAL FIELD

This present disclosure relates to the field of wireless communication technology, and particularly, to a data transmission method, an evolved NodeB and a user equipment.

BACKGROUND

The duplex mode of a Long Term Evolution (LTE) system mainly includes a Frequency Division Duplexing (FDD) mode and a Time Division Duplexing (TDD) mode.

In the TDD mode, the evolved NodeB (eNB) communicates with the User Equipment (UE) in the same frequency, wherein the uplink and downlink data transmissions are performed separately in time. Specifically, one wireless frame includes two half-frames each having five sub-frames. The TDD mode supports different uplink and downlink configurations, which can be adjusted semi-statically through the system messages according to the uplink and downlink average service requirement.

The LTE TDD system totally includes seven types of uplink and downlink configurations, as shown in Table 1, wherein "D" represents the downlink subframe, "U" represents the uplink subframe, and "S" represents the special subframe which is also used for the downlink data transmission.

TABLE 1

| Uplink and downlink configuration | Switching cycle | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Due to the characteristics of the wireless network, a data packet transmitted from the UE to the eNB may be lost or erroneous. When the eNB does not successfully receive the data packet from the UE, the eNB feeds back a NACK instruction to the UE, so as to instruct the UE to retransmit the data packet.

Currently, the data packet retransmission mechanism in the TDD mode is that when receiving the NACK instruction transmitted by the eNB, the UE retransmits the data packet to the eNB in an uplink subframe preconfigured in the standard and uniquely corresponding to the subframe where the data packet is initially transmitted. The retransmitted packet may be scheduled by an Uplink grant (UL_grant) transmitted by the eNB, or scheduled without the UL_grant.

In the LTE system, since the uplink and downlink configurations are semi-statically performed through the system messages according to the average service requirement, the uplink and downlink proportion of the configurations may be unmatched with the type of the instantaneous service, thus the resources cannot be utilized efficiently. For this reason, the subsequent release of the LTE system, such as Release-11 or 12, introduces the dynamic TDD subframe configuration, i.e., some subframes may be dynamically configured to be uplink or downlink, and these subframes are called as dynamical subframes or flexible subframes, and hereinafter are referred to as "dynamical subframes" for simplifying the descriptions.

Due to the introduction of the dynamical subframes, the data packet retransmission mechanism in the current TDD mode has the following problem.

When receiving the NACK instruction transmitted by the eNB, the UE retransmits the data packet to the eNB in corresponding uplink subframe. After introduction of the dynamical subframes, when the uplink subframe in which UE originally plans to retransmit the data packet to the eNB is a dynamical subframe, and the dynamical subframe has been adjusted as a downlink subframe by the eNB, a data transmission conflict will occur, and the UE cannot retransmit the data packet as originally planned, or the eNB cannot issue the data packet according to the original plan, thereby influencing data transmission performance and scheduling flexibility.

SUMMARY

The various embodiments provide a data transmission method, an evolved NodeB (eNB) and a User Equipment (UE), which can avoid the data transmission conflict, and improve the data transmission performance and the scheduling flexibility.

Embodiments provide a data transmission method, comprising: selecting, by an eNB, a second subframe from a plurality of subframes, when the eNB does not correctly receive a data packet transmitted by a UE in a first subframe; and transmitting, by the eNB, a scheduling signaling to the UE, so that the UE transmits a retransmission packet of the data packet in the second subframe.

Embodiments provide a data transmission method, comprising: transmitting, by a UE, a data packet to an eNB in a first subframe; receiving, by the UE, a scheduling signaling transmitted by the eNB when the eNB does not correctly receive the data packet; and transmitting, by the UE, a retransmission packet of the data packet in a second subframe indicated by the scheduling signaling according to the scheduling signaling, wherein the second subframe is selected by the eNB from a plurality of subframes.

Embodiments provide an eNB, comprising: a selecting unit configured to select a second subframe from a plurality of subframes when a data packet transmitted by a UE in a first subframe is not correctly received; and a signaling transmitting unit configured to transmit a scheduling signaling to the UE, so that the UE transmits a retransmission packet of the data packet in the second subframe selected by the selecting unit.

Embodiments provide a UE, comprising a transmitting unit configured to transmit a data packet to an eNB in a first subframe; a signaling receiving unit configured to receive a scheduling signaling transmitted by the eNB when the eNB does not correctly receive the data packet transmitted by the transmitting unit; and a retransmitting unit configured to transmit, according to the scheduling signaling received by the signaling receiving unit, a retransmission packet of the data packet in a second subframe indicated by the scheduling signaling, wherein the second subframe is selected by the eNB from a plurality of subframes.

As can be seen from the above technical solutions, the various embodiments have the following advantages.

In the embodiments, when the eNB does not correctly receive the data packet transmitted by the UE in the first subframe, the eNB selects a second subframe from a plurality of subframes, and notifies the UE to transmit a retransmission packet of the data packet in the second subframe, so that the eNB can schedule the UE to transmit the retransmission packet in a certain subframe. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

DESCRIPTION OF EMBODIMENTS

The various embodiments provide a data transmission method, an eNB and a UE, which can avoid data transmission conflict, and improve data transmission performance and scheduling flexibility.

Figure 1:
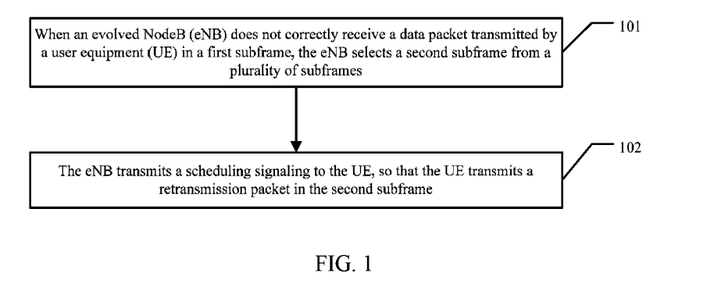
FIG. 1 is a schematic diagram of an embodiment of a data transmission method according to an embodiment.

Referring to FIG. 1, an embodiment of a data transmission method includes:

101: When an eNB does not correctly receive a data packet transmitted by a UE in a first subframe, the eNB selects a second subframe from a plurality of subframes.

The eNB communicates with the UE in the TDD mode, and the UE may transmit the data packet to the eNB through a fixed uplink subframe or a dynamical subframe configured to be uplink.

In this embodiment, the UE transmits the data packet to the eNB in the first subframe, which may be any fixed uplink subframe in the TDD wireless frame, or a dynamical subframe configured to be uplink, and is not limited herein.

To be noted, the data packet transmitted by the UE in the first subframe may be a data packet initially transmitted or retransmitted, and is not limited herein.

After the UE transmits the data packet in the first subframe, the eNB may judge whether the data packet transmitted by the UE is correctly received, and the judgment method is not limited herein.

When the eNB determines that the data packet transmitted by the UE in the first subframe is not correctly received, the eNB may require the UE to perform a retransmission, i.e., to transmit a retransmission packet of the data packet. In this embodiment, the eNB may select the second subframe from a plurality of subframes.

102: The eNB transmits a scheduling signaling to the UE, so that the UE transmits a retransmission packet in the second subframe.

After selecting the second subframe, the eNB may transmit a scheduling signaling to the UE, so as to instruct the UE to transmit a retransmission packet of the data packet in the second subframe.

To be noted, the eNB may notify relevant information of the second subframe to the UE explicitly or implicitly. For example, the eNB may directly carry an identifier of the second subframe in the scheduling signaling, wherein the identifier may be a newly added bit or a newly added CRC mask; or relevant information of the second subframe may also be indicated implicitly through the transmitting time or carrier of the scheduling signaling, or the position of the scheduling signaling in the search space, etc.

In this embodiment, when the eNB does not correctly receive the data packet transmitted by the UE in the first subframe, the eNB selects a second subframe from a plurality of subframes, and notifies the UE to transmit a retransmission packet of the data packet in the second subframe, so that the eNB can schedule the UE to transmit the retransmission packet in a certain subframe. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Figure 2:
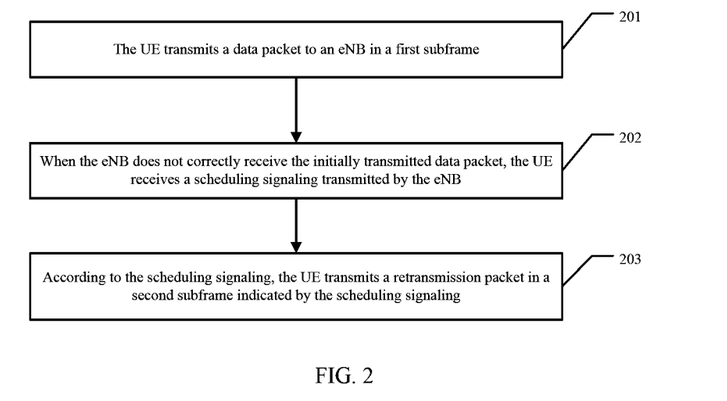
FIG. 2 is a schematic diagram of another embodiment of a data transmission method according to an embodiment.

The data transmission method according to an embodiment is described as above in the perspective of the eNB. Next, the data transmission method of an embodiment will be described as follows in the perspective of the UE. Referring to FIG. 2, another embodiment of the data transmission method includes:

201: The UE transmits a data packet to an eNB in a first subframe.

The eNB communicates with the UE in the TDD mode, and the UE may transmit the data packet to the eNB through a fixed uplink subframe or a dynamical subframe configured to be uplink.

In this embodiment, the UE transmits the data packet to the eNB in the first subframe, which may be any fixed uplink subframe in the TDD wireless frame, or a dynamical subframe configured to be uplink, and is not limited herein.

To be noted, the data packet transmitted by the UE in the first subframe may be a data packet initially transmitted or retransmitted, and herein is not limited.

202: When the eNB does not correctly receive the data packet, the UE receives a scheduling signaling transmitted by the eNB.

When the data packet transmitted by the UE to the eNB in the first subframe is not correctly received by the eNB, the UE may receive from the eNB a scheduling signaling for instructing the eNB to perform a data retransmission.

203: According to the scheduling signaling, the UE transmits a retransmission packet in a second subframe indicated by the scheduling signaling.

After receiving the scheduling signaling, the UE may acquire relevant information of the second subframe according to the scheduling signaling. The specific acquiring method is dependent on the mode adopted by the eNB. If the eNB notifies relevant information of the second subframe to the UE explicitly, the UE may directly acquire the identifier of the second subframe from the scheduling signaling. If the eNB notifies relevant information of the second subframe to the UE implicitly, the UE may acquire relevant information of the second subframe according to the information, such as the transmitting time of the scheduling signaling.

In this embodiment, the second subframe may be selected by the eNB from a plurality of subframes.

After acquiring the relevant information of the second subframe, the UE may transmit the retransmission packet of the data packet to the eNB in the second subframe.

In this embodiment, when the eNB does not correctly receive the data packet transmitted by the UE in the first subframe, the UE may receive the scheduling signaling transmitted by the eNB, and according to the scheduling signaling, transmit the retransmission packet of the data packet in the second subframe indicated by the scheduling signaling, wherein the second subframe is selected by the eNB from a plurality of subframes. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Figure 3:
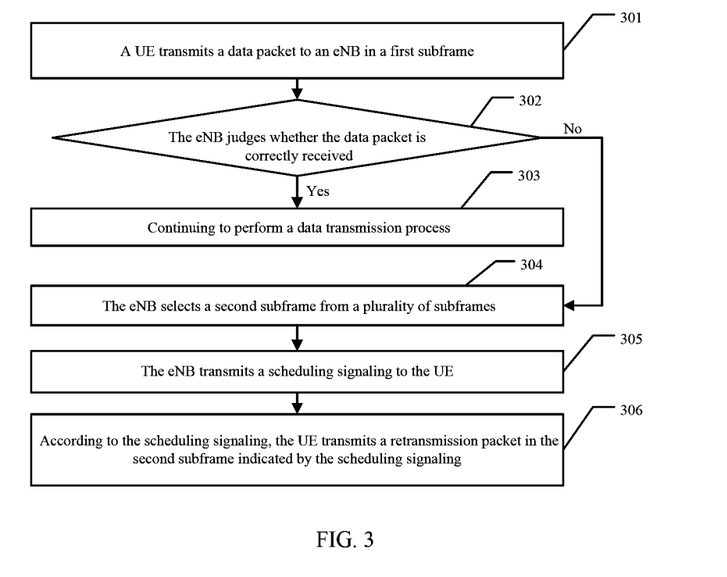
FIG. 3 is a schematic diagram of another embodiment of a data transmission method according to an embodiment.

Next, the data transmission method of the present invention will be described as follows in the perspective of the interaction between the UE and the eNB. Referring to FIG. 3, another embodiment of the data transmission method includes:

301: A UE transmits a data packet to an eNB in a first subframe.

The eNB communicates with the UE in the TDD mode, and the UE may transmit the data packet to the eNB through a fixed uplink subframe or a dynamical subframe configured to be uplink.

The UE transmits the data packet to the eNB in the first subframe, which may be any fixed uplink subframe in the TDD wireless frame, or a dynamical subframe configured to be uplink, and is not limited herein.

To be noted, the data packet transmitted by the UE in the first subframe may be a data packet initially transmitted or retransmitted, and is not limited herein.

302: The eNB judges whether the data packet is correctly received, and if yes, step 303 is performed, otherwise step 304 is performed.

After the UE transmits the data packet to the eNB in the first subframe, the eNB may judge whether the data packet is correctly received, and the specific judgment manner may be:

the eNB judges whether the received data packet can be decoded correctly, and if not, it determines that the data packet is not correctly received.

The embodiment describes the manner for the eNB to judge whether the data packet is correctly received only through one example. It is understandable that in practical applications, in addition to the above judgment manner, the eNB may use more manners to judge whether the data packet is correctly received, and herein is not limited.

303: Continuing to perform a data transmission process.

When the eNB correctly receives the data packet transmitted by the UE in the first subframe, it continues to perform the subsequent data transmission process, and is not limited herein.

304: The eNB selects a second subframe.

When the eNB does not correctly receive the data packet transmitted by the UE in the first subframe, this indicates that the UE is required to perform a retransmission.

The eNB may select from a plurality of subframes a subframe (i.e., the second subframe) used by the UE required to perform a retransmission.

In this embodiment, the eNB may select the second subframe in various manners, specifically:

I. Selecting a Fixed Uplink Subframe from a Plurality of Subframes and Requiring the UE to Perform a Retransmission:

1) The eNB inquires a currently used TDD uplink and downlink configuration type;

The TDD uplink and downlink configuration type may be as shown in Table 1, and after introduction of the dynamical subframes, the uplink and downlink configuration shown in Table 1 may vary correspondingly, and herein is not limited.

2) The eNB determines one fixed uplink subframe as the second subframe from a plurality of subframes according to the TDD uplink and downlink configuration type.

After inquiring the currently used TDD uplink and downlink configuration type, the eNB may determine the fixed uplink subframe from a plurality of subframes according to the TDD uplink and downlink configuration type.

In this embodiment, after introduction of the dynamical subframes, the subframes in the TDD wireless frame may be sorted into fixed uplink subframe, fixed downlink subframe and dynamical subframe, wherein the fixed uplink subframe can only be used to transmit the uplink data, the fixed downlink subframe can only be used to transmit the downlink data, and the dynamical subframe can transmit the uplink data or the downlink data depending on the actual condition.

To be noted, for any TDD uplink and downlink configuration type, the TDD wireless frame necessarily includes at least one fixed uplink subframe, thus the eNB can determine the fixed uplink subframe according to the correspondence between the TDD uplink and downlink configuration type and the fixed uplink subframe.

After determining the fixed uplink subframe, the eNB can take it as the second subframe, because the fixed uplink subframe can only be used to transmit the uplink data and no data transmission conflict will be caused when the UE performs a retransmission by using the fixed uplink subframe. When there are a plurality of fixed uplink subframes, the eNB may select one of them as the second subframe.

II. Selecting an Uplink Subframe According to the Service Requirement and Requiring the UE to Perform a Retransmission:

1) The eNB determines which dynamical subframes are configured to be uplink and which dynamical subframes are configured to be downlink, according to the service requirement.

The eNB may acquire the service requirement information (e.g., the Quality of Service (QoS) parameter) of the currently operated service, and determine which dynamical subframes are configured to be uplink and which dynamical subframes are configured to be downlink, according to the service requirement information.

For example, when the QoS parameter of a certain service indicates that the service requires a higher downlink rate, the eNB may increase the number of the downlink subframes in the dynamical subframes.

2) The eNB selects a dynamical subframe configured to be uplink as the second subframe from a plurality of subframes.

After determining which dynamical subframes are configured to be uplink and which dynamical subframes are configured to be downlink, the eNB may select a dynamical subframe configured to be uplink from a plurality of subframes.

After determining the dynamical subframe configured to be uplink, the eNB can take it as the second subframe, because the UE can transmit the uplink data in the dynamical subframe configured to be uplink and no data transmission conflict will be caused when the UE performs a retransmission by using the dynamical subframe configured to be uplink. When there are multiple dynamical subframes configured to be uplink, the eNB may select one of them as the second subframe.

Two manners for the eNB to select the second subframe are described as above. It is understandable that in practical applications, the eNB may also use other more manners to select the second subframe, provided that the second subframe is a subframe in which the uplink data can be transmitted, and the specific selection manner is not limited herein.

305: The eNB transmits a scheduling signaling to the UE.

After selecting the second subframe, the eNB may transmit the scheduling signaling to the UE, so as to instruct the UE to transmit a retransmission packet of the data packet in the second subframe.

The scheduling signaling transmitted by the eNB to the UE may be Layer 1 signaling or Layer 2 signaling, such as a Physical Downlink Control Channel (PDCCH) signaling, and/or a Physical HARQ Indicator Channel (PHICH) signaling.

This embodiment is described through an example in which the UL_grant signaling is taken as the PDCCH signaling.

In this embodiment, the eNB may notify relevant information of the second subframe to the UE explicitly or implicitly.

When notifying the relevant information of the second subframe to the UE explicitly, the eNB may carry identification information and an identifier which identifies or indicates the second subframe in the UL_grant signaling.

The identification information may be an UL_index field or a Downlink Assignment Index (DAI) field in the UL_grant signaling, or the eNB may carry the identification information by a newly added bit, scramble, etc. into the UL_grant signaling.

For example, a parameter (Subframe_ID) of 2 bits may be newly added into the reserved field of the UL_grant signaling to represent the identifier of the second subframe, or a scramble of several bits may be added into the UL_grant signaling and 2 bits thereof are used to represent the identifier of the second subframe.

When notifying relevant information of the second subframe to the UE implicitly, the eNB may implicitly indicate relevant information of the second subframe through information such as the transmitting time or carrier of the UL_grant signaling.

For example, when the eNB transmits the UL_grant signaling in subframe 6 of wireless frame (i.e., carrier) 1, it indicates that the UE is required to perform a retransmission in subframe 2 of wireless frame 2, i.e., the second subframe is subframe 2 of wireless frame 2; when the eNB transmits the UL_grant signaling in subframe 0, it indicates that the UE is required to perform a retransmission in subframe 7, i.e., the second subframe is subframe 7. Through the above manner, relevant information of the second subframe can be implicitly indicated.

To be noted, in the above implicitly indicated solution, the correspondence between the subframe for transmitting the UL_grant signaling and the subframe for retransmission may be agreed by the eNB and the UE in advance. In practical applications, it may be preferably agreed to use the fixed uplink subframe for retransmission, or other processing manner may also be agreed, which is not limited herein.

In practical applications, the eNB may notify relevant information of the second subframe to the UE in other manners, which is not limited herein.

306: According to the scheduling signaling, the UE transmits the retransmission packet in the second subframe indicated by the scheduling signaling.

After receiving the UL_grant signaling, the UE may acquire relevant information of the second subframe according to the UL_grant signaling. The specific acquiring method is dependent on the mode adopted by the eNB:

When the eNB notifies relevant information of the second subframe to the UE explicitly, the UE may read identification information from the UL_grant signaling, and determine the second subframe according to the identification information.

In this embodiment, the identification information may be an UL_index field or a DAI field in the UL_grant signaling, or a parameter newly added into the reserved field of the UL_grant signaling, or a scramble newly added into the UL_grant signaling, which is not limited herein.

When the eNB notifies relevant information of the second subframe to the UE implicitly, the UE may acquire relevant information of the second subframe according to information such as the transmitting time or carrier of the UL_grant signaling.

Specifically, after receiving the UL_grant signaling, the UE can acquire the UL_grant signaling is transmitted in which subframe of which wireless frame, and then acquire the meaning implicitly indicated by the UL_grant signaling according to an agreement made with the eNB in advance, so as to obtain relevant information of the second subframe.

For example, after receiving the UL_grant signaling, when the UE acquires that the UL_grant signaling is transmitted in subframe 6 of wireless frame (i.e., carrier) 1, according to the agreement made with the eNB in advance, the UE knows that the eNB requires the UE to perform a retransmission in subframe 2 of wireless frame 2, and then it acquires that the second subframe is subframe 2 of wireless frame 2.

After receiving the UL_grant signaling, when the UE acquires that the UL_grant signaling is transmitted in subframe 0, according to the agreement made with the eNB in advance, the UE knows that the eNB requires the UE to perform a retransmission in subframe 7, i.e., the second subframe is subframe 7.

After acquiring relevant information of the second subframe, the UE may transmit the retransmission packet of the data packet to the eNB in the second subframe.

In this embodiment, when the eNB does not correctly receive the data packet transmitted by the UE in the first subframe, the eNB selects a second subframe from a plurality of subframes, and notifies the UE to transmit a retransmission packet of the data packet in the second subframe, so that the eNB can schedule the UE to transmit the retransmission packet of the data packet in a certain subframe. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Figure 4:
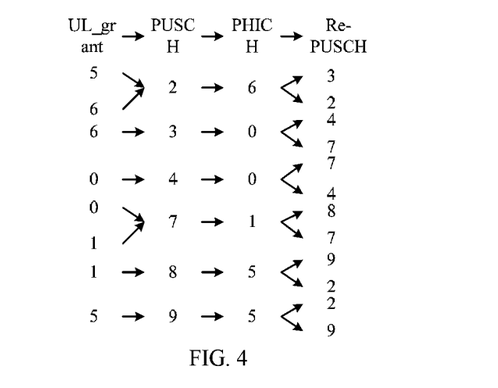
FIG. 4 is a schematic diagram of an uplink scheduling sequence of a TDD uplink and downlink configuration 0 according to an embodiment.

In order to be advantageous for the understanding, the data transmission methods of the present disclosure are described as follows by taking "TDD uplink and downlink configuration 0" as an example. Referring to FIG. 4, FIG. 4 is a schematic diagram of an uplink scheduling sequence of the "TDD uplink and downlink configuration 0" in an embodiment.

After introduction of the dynamical subframes, it is assumed that in the "TDD uplink and downlink configuration 0", subframes 0, 1, 5 and 6 are fixed downlink subframes, subframes 2 and 7 are fixed uplink subframes, and subframes 3, 4, 8 and 9 are dynamical subframes.

The dynamical subframe may be defaulted as the downlink subframe, i.e., the UE detects the PDCCH in the dynamical subframe, and it will not use the dynamical subframe as an uplink subframe until the UE receiving an uplink scheduling signaling for this dynamical subframe, such as the UL_grant signaling.

In order to ensure that the UE can receive the UL_grant, the eNB may transmit the UL_grant to the UE in the fixed downlink subframe, so as to perform an uplink scheduling. In this embodiment, the uplink scheduling sequence is illustrated in FIG. 4.

In FIG. 4, the "UL_grant" is corresponding to the subframe in which the eNB transmits the UL_grant, the "Physical Uplink Shared Channel (PUSCH)" is corresponding to the subframe where the UE transmits the data packet, the "PHICH" is corresponding to the subframe in which the eNB transmits the ACK/NACK, and the "Re-PUSCH" is corresponding to the subframe in which the UE transmits the retransmission packet.

As can be seen from FIG. 4, each fixed downlink subframe can schedule the packets of two uplink subframes. For example, subframe 6 can schedule the data packet of subframe 2 and/or subframe 3, which is dependent on the UL_index field in the UL_grant transmitted in the subframe 6. For example, when UL_index=10, it indicates that the data packet of subframe 2 is to be scheduled; when UL_index=01, it indicates that the data packet of subframe 3 is to be scheduled; and when UL_index=11, it indicates that the packets of subframes 2 and 3 are to be scheduled simultaneously.

Based on the uplink scheduling sequence in FIG. 4, the specific data transmission process in this embodiment may be as follows:

1) The eNB transmits a UL_grant.

The eNB transmits to the UE in subframe 6 the UL_grant, in which UL_index=01.

2) The UE receives the UL_grant.

The UE receives the UL_grant transmitted by the eNB in subframe 6, analyzes the UL_grant to obtain UL_index=01, and then may acquire that the UE can transmit the uplink data in subframe 3.

3) The UE transmits a data packet.

The UE transmits the data packet to the eNB in subframe 3.

4) The eNB selects a subframe to be used by the UE for retransmission.

When the eNB does not correctly receive the data packet transmitted by the UE in subframe 3, then this indicates that the UE is required to perform a retransmission, and the eNB may select the subframe to be used by the UE for retransmission.

In this embodiment, when the eNB does not correctly receive the data packet transmitted by the UE in subframe 3, the eNB may select the subframe to be used by the UE for retransmission in the following manner.

Firstly, the eNB acquires a currently used TDD uplink and downlink configuration type, and acquires that it is "TDD uplink and downlink configuration 0", then the eNB searches for fixed uplink subframes of the "TDD uplink and downlink configuration 0" and acquires that they are "subframe 2" and "subframe 7", and the eNB may select one of them as the subframe to be used by the UE for retransmission. In this embodiment, it is assumed that the "subframe 7" is selected.

5) The eNB returns a PHICH signaling.

The eNB may return the PHICH signaling in subframe 0, including NACK which indicates that the eNB does not correctly receive the data packet transmitted by the UE in uplink subframe 3.

Meanwhile, the eNB may transmit the UL_grant to the UE. In order to improve the compatibility with the current solution, the value of the UL_index in the UL_grant may be used to represent subframe 4 and/or subframe 7. In this embodiment, UL_index=01, and it is used to represent subframe 7.

6) The UE performs a retransmission.

The UE obtains NACK after receiving the PHICH signaling returned by the eNB in subframe 0, and acquires that the eNB does not correctly receive the data packet transmitted by the UE in uplink subframe 3. According to the solution of the prior art, the UE will directly transmit the retransmission packet of the data packet to the eNB in subframe 4.

However, in this embodiment, the UE receives the UL_grant in subframe 0 and obtains UL_index=01, and then the UE acquires that the uplink data needs to be transmitted in subframe 7. Thus the UE transmits the retransmission packet of the data packet in subframe 7 rather than subframe 4.

Similarly, when the data packet transmitted by the UE in subframe 2 needs to be retransmitted, according to the solution of the prior art, the UE transmits the retransmission packet of the data packet in subframe 3, while according to the solution of this embodiment, the UE performs a retransmission in subframe 2 of the next TDD wireless frame.

This embodiment is only described through an example in which the eNB selects a fixed uplink subframe. It is understandable that in practical applications, the eNB may also select a subframe configured to be uplink according to the service requirement, and the specific process is not limited herein.

To be noted, in this embodiment, the UL_grant transmitted by the eNB in subframe 0 may schedule the UE to perform a retransmission in subframe 4 or 7, and the UL_grant transmitted by the eNB in subframe 6 may schedule the UE to perform a retransmission in subframe 2 or 3, and so on.

It can be seen that relative to the solution of the existing standard, this embodiment does not introduce any new timing relationship, thus the compatibility with the solution of the existing standard can be improved.

It is observed that in the existing seven kinds of TDD uplink and downlink configurations, subframes 2 and 7 are both uplink subframes, i.e., they can be deemed as fixed uplink subframes, while other uplink subframes except subframes 2 and 7 can be regarded as dynamical subframes. Thus, the above embodiment may also be extended to following general cases.

The eNB selects a fixed uplink subframe as the second subframe from the plurality of subframes according to the timing relationship of a first reference Time Division Duplex (TDD) uplink and downlink configuration. Or the eNB selects an uplink dynamical subframe as the second subframe from the plurality of subframes according to the timing relationship of the first reference TDD uplink and downlink configuration.

Figure 5:
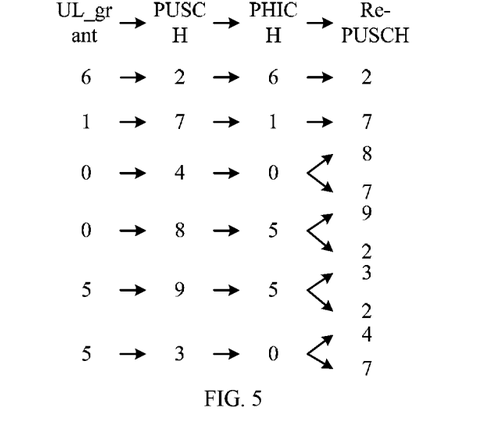
FIG. 5 is a schematic diagram of an uplink scheduling sequence self-defined in an embodiment.

Specifically, the first reference TDD uplink and downlink configuration may be the currently used TDD uplink and downlink configuration (i.e., the TDD uplink and downlink configuration notified in the system message), TDD uplink and downlink configuration 0 or other configuration (e.g., a new timing relationship shown in FIG. 5, which is different from the timing relationships of the existing seven kinds of configurations). The timing relationship may be an uplink scheduling timing relationship, such as a timing relationship from the UL_grant of an initial transmission and/or a retransmission to the PUSCH.

Correspondingly, the UE transmits a retransmission packet of the data packet in the second subframe indicated by the scheduling signaling according to the scheduling signaling and the timing relationship of the first reference TDD uplink and downlink configuration.

FIG. 4 illustrates a schematic diagram of an uplink scheduling sequence of "TDD uplink and downlink configuration 0". When an uplink scheduling sequence of other configuration type or a self-defined uplink scheduling sequence is used in practical applications, the processing may be performed according to a solution similar to that in this embodiment. For example, FIG. 5 is a schematic diagram of a self-defined uplink scheduling sequence in this embodiment.

In FIG. 5, two fixed uplink subframes 2 and 7 have unique sequence relationships for initial transmission and retransmission, respectively, i.e., the UL_grants are one-by-one corresponding to the PUSCHs, and the UL_grants/PHICHs are also one-by-one corresponding to the Re-PUSCHs, thus the usage of the UL_index is not required in the UL_grant for scheduling the fixed uplink subframes (e.g., subframes 2 and 7), and thus when the TDD uplink and downlink configuration is not zero, the usage of the UL_DAI may be maintained in the UL_grant, i.e., the number of subframes scheduled in a certain time window is notified, and the number of subframes include subframes scheduled by the time window to the PDSCH of the UE and subframes for the release of downlink Semi-Persistent Scheduling (SPS). With respect to the UL_grant for scheduling the dynamical subframes configured to be uplink, when the TDD uplink and downlink configuration is not zero, the UL_DAI in the UL_grant may be used as the UL_index. The specific data transmission process is similar to that described in the previous embodiment, and herein is omitted.

To be noted, in the above embodiment, the UE may perform a data retransmission in the second subframe according to the scheduling of the eNB. In that case, when the UE further needs to upload some retransmission packets of the data packets of the non-adaptive retransmission in the second subframe, the UE may adopt the following processing manners.

In certain aspects, the UE may discard the retransmission packets of the data packets of the non-adaptive retransmission, and only transmit the retransmission packets of the data packets of the adaptive retransmission in the second subframe.

Alternatively, the UE may simultaneously transmit two retransmission packets in the second subframe, for example, by using a plurality of codewords or uplink resource block clusters, and the encoding mode may be joint or independent encoding, which is not limited herein.

In this embodiment, when the eNB does not correctly receive the data packet transmitted by the UE in the first subframe, the eNB selects a second subframe from a plurality of subframes, and notifies the UE to transmit a retransmission packet of the data packet in the second subframe, so that the eNB can schedule the UE to transmit the retransmission packet in a certain subframe. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Figure 6:
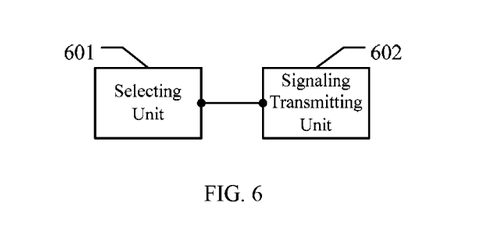
FIG. 6 is a schematic diagram of an embodiment of an eNB according to an embodiment.

Next, an eNB in the embodiment of the present invention will be described. Referring to FIG. 6, an embodiment of the eNB includes:

a selecting unit 601 configured to select a second subframe from a plurality of subframes when a data packet transmitted by a UE in a first subframe is not correctly received; and a signaling transmitting unit 602 configured to transmit a scheduling signaling to the UE, so that the UE transmits a retransmission packet of the data packet in the second subframe selected by the selecting unit 601.

In this embodiment, the selecting unit 601 may select the second subframe in various manners, including the following cases:

I. Selecting the Fixed Uplink Subframe:

In this embodiment, the selecting unit is specifically configured to inquire about a currently used TDD uplink and downlink configuration type, and determine a fixed uplink subframe as the second subframe from the plurality of subframes according to the TDD uplink and downlink configuration type. In practical applications, the function of the selecting unit may also be realized in several modules, and an example is given as follows.

Figure 7:
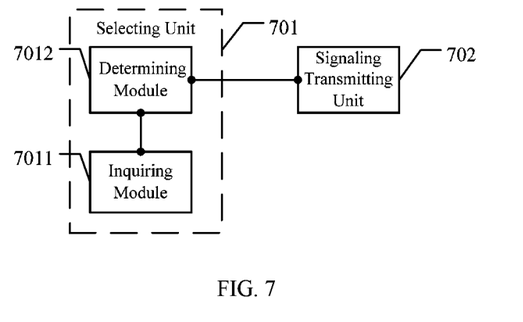
FIG. 7 is a schematic diagram of another embodiment of an eNB according to an embodiment.

Specifically, please referring to FIG. 7, another embodiment of the eNB includes:

a selecting unit 701 configured to select a second subframe from a plurality of subframes when a data packet transmitted by a UE in a first subframe is not correctly received; and a signaling transmitting unit 702 configured to transmit a scheduling signaling to the UE, so that the UE transmits a retransmission packet of the data packet in the second subframe selected by the selecting unit 701.

In certain aspects, the selecting unit 701 may further include:

an inquiring module 7011 configured to inquire about the currently used TDD uplink and downlink configuration type; and a determining module 7012 configured to determine a fixed uplink subframe as the second subframe from the plurality of subframes, according to the TDD uplink and downlink configuration type inquired about by the inquiring module 7011.

In order to be advantageous for the understanding, next, a specific application scenario is taken as an example to describe the interactions between various units in this embodiment.

In this embodiment, when the eNB does not correctly receive the data packet transmitted by the UE in the first subframe, the inquiring module 7011 in the selecting unit 701 may firstly inquire about the currently used TDD uplink and downlink configuration type.

To be noted, the TDD uplink and downlink configuration type may be as shown in Table 1, and after introduction of the dynamical subframes, the uplink and downlink configuration shown in Table 1 may vary correspondingly, and herein is not limited.

After the inquiring module 7011 inquires about the currently used TDD uplink and downlink configuration type, the determining module 7012 may determine the fixed uplink subframe from the plurality of subframes according to the TDD uplink and downlink configuration type.

In this embodiment, after introduction of the dynamical subframes, the subframes in the TDD wireless frame may be sorted into fixed uplink subframe, fixed downlink subframe and dynamical subframe, wherein the fixed uplink subframe can only be used to transmit the uplink data, the fixed downlink subframe can only be used to transmit the downlink data, and the dynamical subframe can transmit the uplink data or the downlink data depending on the actual condition.

To be noted, for any TDD uplink and downlink configuration type, the TDD wireless frame necessarily includes at least one fixed uplink subframe, thus the determining module 7012 can determine the fixed uplink subframe according to the correspondence between the TDD uplink and downlink configuration type and the fixed uplink subframe.

After determining the fixed uplink subframe, the determining module 7012 can take it as the second subframe, because the fixed uplink subframe can only be used to transmit the uplink data and no data transmission conflict will be caused when the UE performs a retransmission by using the fixed uplink subframe. When there are multiple fixed uplink subframes, the determining module 7012 may select one of them as the second subframe.

The signaling transmitting unit 702 may transmit a scheduling signaling to the UE, so that the UE transmits the retransmission packet of the data packet in the second subframe determined by the determining module 7012.

In this embodiment, the process of the signaling transmitting unit 702 transmitting the scheduling signaling to the UE may be similar to that described in step 305 of the embodiment illustrated in FIG. 3, and herein is omitted.

Another embodiment of the eNB is similar to that illustrated in FIG. 7, and the difference lies in that the selecting unit is specifically configured to:

select a fixed uplink subframe as the second subframe from the plurality of subframes according to the timing relationship of a first reference TDD uplink and downlink configuration; or select an uplink dynamical subframe as the second subframe from the plurality of subframes according to the timing relationship of the first reference TDD uplink and downlink configuration.

II. Selecting the Uplink Subframe According to the Service Requirement

In this embodiment, the selecting unit is specifically configured to select a dynamical subframe configured to be uplink as the second subframe from a plurality of subframes.

Figure 8:
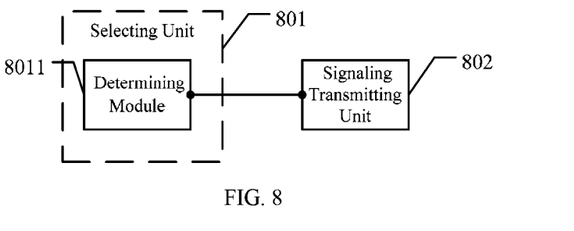
FIG. 8 is a schematic diagram of another embodiment of an eNB according to an embodiment.

In practical applications, the function may also be realized by a certain module in the selecting unit, and an example is given as follows:

Specifically, please referring to FIG. 8, another embodiment of the eNB includes:

a selecting unit 801 configured to select a second subframe from a plurality of subframes when a data packet transmitted by a UE in a first subframe is not correctly received; and a signaling transmitting unit 802 configured to transmit a scheduling signaling to the UE, so that the UE transmits a retransmission packet of the data packet in the second subframe selected by the selecting unit 801.

In certain aspects, the selecting unit 801 may further include:

a determining module 8011 configured to select a dynamical subframe configured to be uplink as the second subframe from the plurality of subframes.

In order to be advantageous for the understanding, next, a specific application scenario is taken as an example to describe the interactions between various units in this embodiment.

In this embodiment, when the eNB does not correctly receive the data packet transmitted by the UE in the first subframe, the eNB may acquire the service requirement information (e.g., the QoS parameter) of the currently operated service, and determine which dynamical subframes are configured to be uplink and which dynamical subframes are configured to be downlink, according to the service requirement information.

For example, when the QoS parameter of a certain service indicates that the service requires a high downlink rate, the eNB may increase the number of the downlink subframes in the dynamical subframes.

After acquiring which dynamical subframes are configured to be uplink and which dynamical subframes are configured to be downlink, the determining module 8011 may select a dynamical subframe configured to be uplink from the plurality of subframes.

After selecting the dynamical subframe configured to be uplink, the determining module 8011 can take it as the second subframe, because the UE can transmit the uplink data in the dynamical subframe configured to be uplink and no data transmission conflict will be caused when the UE performs a retransmission by using the dynamical subframe configured to be uplink. When there are multiple dynamical subframes configured to be uplink, the determining module 8011 may select one of them as the second subframe.

The signaling transmitting unit 802 may transmit a scheduling signaling to the UE, so that the UE transmits the retransmission packet of the data packet in the second subframe determined by the determining module 8011.

In this embodiment, the process of the signaling transmitting unit 802 transmitting the scheduling signaling to the UE may be similar to that described in step 305 of the embodiment illustrated in FIG. 3, and herein is omitted.

Two manners for implementing the selecting unit in the eNB are described as above. It is understandable that in practical applications, the selecting unit in the eNB may use other more manners to select the second subframe, provided that the second subframe is a subframe in which the uplink data can be transmitted, and the specific selection manner is not limited herein.

In this embodiment, when the eNB does not correctly receive the data packet transmitted by the UE in the first subframe, the selecting unit in the eNB selects a second subframe from a plurality of subframes, and the signaling transmitting unit in the eNB notifies the UE to transmit a retransmission packet of the data packet in the second subframe, so that the eNB can schedule the UE to transmit the retransmission packet in a certain subframe. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Figure 9:
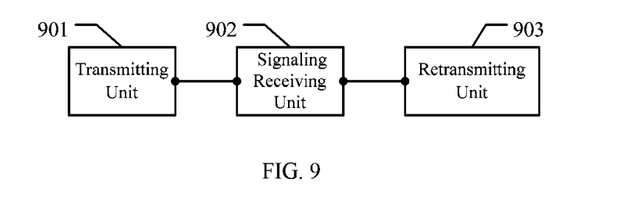
FIG. 9 is a schematic diagram of an embodiment of a UE according to an embodiment.

Referring to FIG. 9, an embodiment of the UE includes:

a transmitting unit 901 configured to transmit a data packet to an eNB in a first subframe;

a signaling receiving unit 902 configured to receive a scheduling signaling transmitted by the eNB when the eNB does not correctly receive the data packet transmitted by the transmitting unit 901; and a retransmitting unit 903 configured to transmit, according to the scheduling signaling received by the signaling receiving unit 902, a retransmission packet of the data packet in a second subframe indicated by the scheduling signaling, wherein the second subframe is selected by the eNB from the plurality of subframes.

Figure 10:
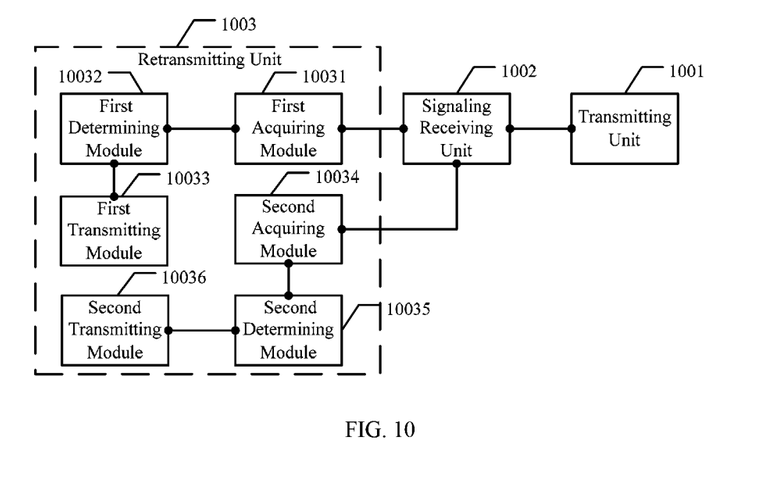
FIG. 10 is a schematic diagram of another embodiment of a UE according to an embodiment.

Referring to FIG. 10, another embodiment of the UE includes:

a transmitting unit 1001 configured to transmit a data packet to an eNB in a first subframe;

a signaling receiving unit 1002 configured to receive a scheduling signaling transmitted by the eNB when the eNB does not correctly receive the data packet transmitted by the transmitting unit 1001; and a retransmitting unit 1003 configured to transmit, according to the scheduling signaling received by the signaling receiving unit 1002, a retransmission packet of the data packet in a second subframe indicated by the scheduling signaling, wherein the second subframe is selected by the eNB from the plurality of subframes.

In this embodiment, the scheduling signaling may be an UL_grant signaling.

In this embodiment, the retransmitting unit 1003 may further include:

a first acquiring module 10031 configured to acquire indication information for indicating the second subframe and contained in the UL_grant signaling;

a first determining module 10032 configured to determine the second subframe according to the indication information acquired by the first acquiring module 10031; and a first transmitting module 10033 configured to transmit a retransmission packet of the data packet in the second subframe determined by the first determining module 10032.

In this embodiment, the scheduling signaling may be an UL_grant signaling, and the identification or indication information may be an UL_index field or a DAI field in the UL_grant signaling, or a parameter newly added into the reserved field of the UL_grant signaling, or a scramble newly added into the UL_grant signaling, which is not limited herein.

In this embodiment, the retransmitting unit 1003 may further include:

a second acquiring module 10034 configured to acquire transmitting time or carrier of the UL_grant signaling;

a second determining module 10035 configured to determine the second subframe according to the transmitting time or carrier of the UL_grant signaling acquired by the second acquiring module 10034; and a second transmitting module 10036 configured to transmit the retransmission packet of the data packet in the second subframe determined by the second determining module 10035.

In order to be advantageous for the understanding, next, a specific application scenario is taken as an example to describe the interactions between various units in this embodiment.

The eNB and the UE communicate with each other in the TDD mode. The transmitting unit 1001 in the UE may transmit the data packet to the eNB through the fixed uplink subframe or the dynamical subframe configured to be uplink.

The transmitting unit 1001 transmits the data packet to the eNB in a first subframe, which may be any fixed uplink subframe in the TDD wireless frame, or a dynamical subframe configured to be uplink, and herein is not limited.

When the eNB does not correctly receive the data packet, the signaling receiving unit 1002 in the UE can receive the UL_grant signaling transmitted by the eNB.

The first acquiring module 10031 in the retransmitting unit 1003 may acquire the identification or indication information which indicates the second subframe from the UL_grant signaling. Next, the first determining module 10032 in the retransmitting unit 1003 may determine the second subframe according to the acquired indication information, and after the first determining module 10032 determines the second subframe, the first transmitting module 10033 in the retransmitting unit 1003 may transmit the retransmission packet of the data packet in the second subframe.

To be noted, in practical applications, the UE may acquire relevant information of the second subframe in other methods besides the above one, and the specific acquiring method is dependent on the mode adopted by the eNB:

When the eNB notifies relevant information of the second subframe to the UE explicitly, the UE may read indication information from the UL_grant signaling, and determine the second subframe according to the indication information.

In this embodiment, the indication information may be an UL_index field or a DAI field in the UL_grant signaling, or a parameter newly added into the reserved field of the UL_grant signaling, or a scramble newly added into the UL_grant signaling, which is not limited herein.

When the eNB notifies relevant information of the second subframe to the UE implicitly, the UE may acquire relevant information of the second subframe according to information such as the transmitting time or carrier of the UL_grant signaling.

When the eNB notifies relevant information of the second subframe to the UE implicitly, the second acquiring module 10034 in the retransmitting unit 1003 may acquire the transmitting time or carrier of the UL_grant signaling. Next, the second determining module 10035 in the retransmitting unit 1003 may determine the second subframe according to the transmitting time or carrier of the UL_grant signaling acquired by the second acquiring module 10034. After the second determining module 10035 determines the second subframe, the second transmitting module 10036 in the retransmitting unit 1003 may transmit the retransmission packet of the data packet in the second subframe.

In this embodiment, when the eNB does not correctly receive the data packet transmitted by the UE in the first subframe, the signaling receiving unit 1002 in the UE receives the scheduling signaling from the eNB, and according to the scheduling signaling, the retransmitting unit 1003 transmits the retransmission packet of the data packet in the second subframe indicated by the scheduling signaling, wherein the second subframe is selected by the eNB from a plurality of subframes. Since the eNB can acquire which dynamical subframes are configured to be uplink and which dynamical subframes are configured to be downlink, no downlink data will be transmitted in the second subframe selected by the eNB, thereby avoiding the data transmission conflict, and improving the data transmission performance and the scheduling flexibility.

Another embodiment of the UE is similar to that illustrated in FIG. 9, and a difference lies in that the retransmitting unit is specifically configured to:

transmit the retransmission packet of the data packet in the second subframe indicated by the scheduling signaling according to the scheduling signaling and the timing relationship of the first reference TDD uplink and downlink configuration.

A person skilled in the art readily understands that implementation of all or a part of the steps of the methods in the above embodiments may be completed by instructing relevant hardware through a program that may be stored in a non-transitory computer readable storage medium, such as Read Only Memory (ROM), magnetic disk, optical disk, etc.

A data transmission method, an eNB and a UE provided by the embodiments are detailedly described as above. A person skilled in the art may change the embodiments and the application range according to ideas of the embodiments. Therefore, the contents of the Specification shall not be construed as limitations to the present embodiments.

What is claimed is:

1. A data transmission method, comprising:
   selecting, by an evolved NodeB (eNB), a second subframe from a plurality of subframes, when the eNB does not correctly receive a data packet transmitted by a User Equipment (UE) in a first subframe; and
   transmitting, by the eNB, a scheduling signaling to the UE, so that the UE transmits a retransmission packet of the data packet in the second subframe,
   wherein the selecting, by the eNB, the second subframe from the plurality of subframes comprises one of:
   selecting, by the eNB, a fixed uplink subframe as the second subframe from the plurality of subframes according to a timing relationship of a first reference Time Division Duplexing (TDD) uplink and downlink configuration; and
   inquiring about, by the eNB, a currently used TDD uplink and downlink configuration type, and determining a fixed uplink subframe as the second subframe from the plurality of subframes according to the TDD uplink and downlink configuration type,
   wherein the timing relationship of the first reference TDD uplink and downlink configuration is:

-continued wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 3, 4, 8 and 9.

2. The method according to claim 1, wherein the scheduling signaling transmitted by the eNB to the UE includes the Uplink grant (UL_grant) signaling; and
   the UL_grant signaling contains identification information for identifying the second subframe.

3. The method according to claim 2, wherein the identification information includes:
   an UL_index field; or
   a Downlink Assignment Index (DAI) field; or
   a scramble newly added into the UL_grant signaling; or
   a parameter newly added into a reserved field of the UL_grant signaling.

4. The method according to claim 1, wherein when the currently used TDD uplink and downlink configuration type is TDD uplink and downlink configuration 0, the step of determining the fixed uplink subframe as the second subframe from the plurality of subframes according to the TDD uplink and downlink configuration type comprises: determining a fixed uplink subframe as the second subframe according to the following uplink scheduling sequence of the TDD uplink and downlink configuration 0:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 2, 3, 4, 7, 8 and 9.

5. A data transmission method, comprising:
transmitting, by a User Equipment (UE), a data packet to an evolved NodeB (eNB) in a first subframe;
receiving, by the UE, a scheduling signaling transmitted by the eNB when the eNB does not correctly receive the data packet; and
transmitting, by the UE, a retransmission packet of the data packet in a second subframe indicated by the scheduling signaling according to the scheduling signaling, wherein the second subframe is selected by the eNB from a plurality of subframes,
wherein the second subframe being selected by the eNB from a plurality of subframes comprises one of:
selecting, by the eNB, a fixed uplink subframe as the second subframe from the plurality of subframes according to a timing relationship of a first reference Time Division Duplexing, TDD, uplink and downlink configuration; and
inquiring about, by the eNB, a currently used TDD uplink and downlink configuration type, and determining a fixed uplink subframe as the second subframe from the plurality of subframes according to the TDD uplink and downlink configuration type,
wherein the timing relationship of the first reference TDD uplink and downlink configuration is:

wherein UL_grant corresponds to a subframe in which the eNB transmits an Uplink grant (UL_grant) signaling, wherein corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 4, 8, 9 and 3.

6. The method according to claim 5, wherein the transmitting, by the UE, the retransmission packet of the data packet in the second subframe indicated by the scheduling signaling according to the scheduling signaling comprises:
transmitting, by the UE, the retransmission packet of the data packet in the second subframe indicated by the scheduling signaling, according to the scheduling signaling and the timing relationship of the first reference TDD uplink and downlink configuration.

7. The method according to claim 5, wherein the scheduling signaling is the Uplink grant (UL_grant) signaling, and wherein:
the transmitting, by the UE, the retransmission packet of the data packet in the second subframe indicated by the scheduling signaling according to the scheduling signaling comprises:
acquiring, by the UE, identification information for identifying the second subframe and contained in the UL_grant signaling;
determining, by the UE, the second subframe according to the identification information; and
transmitting, by the UE, the retransmission packet of the data packet in the second subframe.

8. The method according to claim 7, wherein the identification information includes:
an UL_index field; or
a Downlink Assignment Index (DAI) field; or
a scramble newly added into the UL_grant signaling; or
a parameter newly added into a reserved field of the UL_grant signaling.

9. The method according to claim 5, wherein the scheduling signaling is the UL_grant signaling;
the transmitting, by the UE, the retransmission packet of the data packet in the second subframe indicated by the scheduling signaling according to the scheduling signaling comprises:
acquiring, by the UE, a transmitting time or carrier of the UL_grant signaling;
determining, by the UE, the second subframe according to the transmitting time or carrier of the UL_grant signaling; and
transmitting, by the UE, the retransmission packet of the data packet in the second subframe.

10. The method according to claim 5, wherein when the currently used TDD uplink and downlink configuration type is TDD uplink and downlink configuration 0, the step of determining the fixed uplink subframe as the second subframe from the plurality of subframes according to the TDD uplink and downlink configuration type comprises: determining a fixed uplink subframe as the second subframe according to the following uplink scheduling sequence of the TDD uplink and downlink configuration 0:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 2, 3, 4, 7, 8 and 9.

11. An evolved NodeB (eNB), comprising:
a processor configured to select a second subframe from a plurality of subframes when a data packet transmitted by a User Equipment (UE) in a first subframe is not correctly received; and
a transmitter configured to transmit a scheduling signaling to the UE, so that the UE transmits a retransmission packet of the data packet in the second subframe selected by the selecting unit,
wherein the processor selecting the second subframe from the plurality of subframes comprises one of:
inquiring about a currently used Time Division Duplexing (TDD) uplink and downlink configuration type, and determining a fixed uplink subframe as the second subframe from the plurality of subframes according to the TDD uplink and downlink configuration type; or
selecting a fixed uplink subframe as the second subframe from the plurality of subframes according to a timing relationship of a first reference TDD uplink and downlink configuration,
wherein the timing relationship of the first reference TDD uplink and downlink configuration is:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 4, 8, 9 and 3.

12. The eNB according to claim 11, wherein when the currently used TDD uplink and downlink configuration type is TDD uplink and downlink configuration 0, the step of determining the fixed uplink subframe as the second subframe from the plurality of subframes according to the TDD uplink and downlink configuration type comprises: determining a fixed uplink subframe as the second subframe according to the following uplink scheduling sequence of the TDD uplink and downlink configuration 0:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 2, 3, 4, 7, 8 and 9.

13. A User Equipment (UE), comprising:
a transmitter configured to transmit a data packet to an evolved NodeB (eNB) in a first subframe;
a receiver configured to receive a scheduling signaling transmitted by the eNB when the eNB does not correctly receive the data packet transmitted by the transmitter; and
a retransmitter configured to transmit, according to the scheduling signaling received by the receiver, a retransmission packet of the data packet in a second subframe indicated by the scheduling signaling, wherein the second subframe is selected by the eNB from a plurality of subframes,
wherein the second subframe being selected by the eNB from the plurality of subframes comprises one of:
selecting, by the eNB, a fixed uplink subframe as the second subframe from the plurality of subframes according to a timing relationship of a first reference Time Division Duplexing, TDD, uplink and downlink configuration; and inquiring about, by the eNB, a currently used TDD uplink and downlink configuration type, and determining a fixed uplink subframe as the second subframe from the plurality of subframes according to the TDD uplink and downlink configuration type, wherein the timing relationship of the first reference TDD uplink and downlink configuration is:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 4, 8, 9 and 3.

14. The UE according to claim 13, wherein the scheduling signaling is the UL_grant signaling, and wherein:
the retransmitter comprises:
a processor configured to:
acquire identification information for identifying the second subframe and contained in an Uplink grant (UL_grant) signaling;
determine the second subframe according to the identification information acquired by the processor; and
transmit the retransmission packet of the data packet in the second subframe determined by the processor.

15. The UE according to claim 13, wherein the scheduling signaling is the UL_grant signaling, and wherein:
the retransmitter comprises:
a processor configured to:
acquire a transmitting time or carrier of the UL_grant signaling;
determine the second subframe according to the transmitting time or carrier of the UL_grant signaling acquired by the processor; and
transmit the retransmission packet of the data packet in the second subframe determined by the processor.

16. The UE according to claim 13, wherein when the second subframe being selected by the eNB from the plurality of subframes comprises: selecting, by the eNB, a fixed uplink subframe as the second subframe from the plurality of subframes according to a timing relationship of the first reference TDD uplink and downlink configuration, the retransmitter is configured to:
transmit the retransmission packet of the data packet in the second subframe indicated by the scheduling signaling according to the scheduling signaling and the timing relationship of the first reference TDD uplink and downlink configuration.

17. The UE according to claim 13, wherein when the currently used TDD uplink and downlink configuration type is TDD uplink and downlink configuration 0, the step of determining the fixed uplink subframe as the second subframe from the plurality of subframes according to the TDD uplink and downlink configuration type comprises: determining a fixed uplink subframe as the second subframe according to the following uplink scheduling sequence of the TDD uplink and downlink configuration 0:

wherein UL_grant corresponds to a subframe in which the eNB transmits an Uplink grant (UL_grant) signaling, wherein PUSCH corresponds to a subframe where the UE transmits the data packet, wherein PHICH corresponds to a subframe in which the eNB transmits an ACK/NACK, and wherein Re-PUSCH corresponds to a subframe in which the UE transmits the retransmission packet, and wherein subframes 0, 1, 5 and 6 are fixed downlink subframes, subframes 2 and 7 are fixed uplink subframes, and subframes 3, 4, 8 and 9 are dynamical subframes, wherein the first subframe is one of subframes 2, 3, 4, 7, 8 and 9.

* * * * *